United States Patent
Salgado et al.

(10) Patent No.: US 7,607,600 B2
(45) Date of Patent: Oct. 27, 2009

(54) MEAT SHREDDER

(76) Inventors: Martin Salgado, 1010 Sagebrush, Dalhart, TX (US) 79022; Marisol Salgado, 1010 Sagebrush, Dalhart, TX (US) 79022

( * ) Notice: Subject to any disclaimer, the term of this patent is extended or adjusted under 35 U.S.C. 154(b) by 118 days.

(21) Appl. No.: 11/898,572

(22) Filed: Sep. 13, 2007

(65) Prior Publication Data

US 2009/0072058 A1 Mar. 19, 2009

(51) Int. Cl.
*B02C 18/14* (2006.01)
(52) U.S. Cl. .............. 241/199.7; 241/199.12; 241/285.3
(58) Field of Classification Search .............. 241/199.7, 241/199.12, 285.3, 285.2, 82.1–82.7
See application file for complete search history.

(56) References Cited

U.S. PATENT DOCUMENTS

| | | | |
|---|---|---|---|
| 234,478 A * | 11/1880 | Hubner | 241/285.3 |
| 1,521,346 A | 12/1924 | Weidlich | |
| 1,527,087 A | 2/1925 | Schulman | |
| 2,678,073 A | 5/1954 | Nardis | |
| 2,894,551 A * | 7/1959 | Fritz Otto | 241/37.5 |
| 3,315,903 A | 4/1967 | Vernon | |
| 4,263,135 A | 4/1981 | Yeagley | |
| 4,453,458 A | 6/1984 | Altman | |
| 4,572,443 A | 2/1986 | Coleman | |
| 4,878,627 A * | 11/1989 | Otto | 241/199.12 |
| 5,104,050 A | 4/1992 | Herbert | |
| 6,168,101 B1 | 1/2001 | Xie | |
| 6,676,051 B2 | 1/2004 | Rebordosa et al. | |
| 2004/0021019 A1 | 2/2004 | Gaartz et al. | |
| 2006/0154588 A1 | 7/2006 | Evers | |
| 2007/0001040 A1 | 1/2007 | Walters | |

FOREIGN PATENT DOCUMENTS

JP 10229809 9/1998

* cited by examiner

*Primary Examiner*—Mark Rosenbaum
(74) *Attorney, Agent, or Firm*—Richard C. Litman

(57) ABSTRACT

The meat shredder includes a hopper made from stainless steel or other suitable stainless, food-safe, non-corrosive and easily to clean material. The hopper has a cover that can be releasably latched to the open top of the hopper. The hopper is rotatably mounted on a stand. A motor is attached to one side of the hopper and has a shaft that extends into the hopper. A spindle is mounted on the shaft and disposed inside the hopper. Rows of triangular-shaped extend radially from the spindle, with adjacent rows being canted in opposite directions. The motor rotates the spindle to shred the meat. A handle may be attached to the motor and used to manually rotate both the motor and the hopper on the stand to shake up or redistribute the meat within the hopper for thorough shredding.

7 Claims, 4 Drawing Sheets

MEAT SHREDDER

BACKGROUND OF THE INVENTION

1. Field of the Invention

The present invention relates to food preparation appliances, and particularly to a meat shredder suitable for use in restaurants, cafeterias, and the like.

2. Description of the Related Art

Restaurants, cafeterias, and the like often have items on their menus that require shredded or ground meat (such as tacos or burritos, for example). In order to provide such food freshly prepared, these establishments need a device for shredding or grinding the meat on the premises. The shredder needs to be capable of shredding large quantities of meat quickly and efficiently in order to reduce food preparation time, while being easy to operate.

Thus, a meat shredder solving the aforementioned problems is desired.

SUMMARY OF THE INVENTION

The meat shredder includes a hopper made from stainless steel or other suitable stainless, food-safe, non-corrosive and easily to clean material. The hopper has a cover that can be releasably latched to the open top of the hopper. The hopper is rotatably mounted on a stand. A motor is attached to one side of the hopper and has a shaft that extends into the hopper. A spindle is mounted on the shaft and disposed inside the hopper. Rows of triangular-shaped extend radially from the spindle, with adjacent rows being canted in opposite directions. The motor rotates the spindle to shred the meat. A handle may be attached to the motor and used to manually rotate both the motor and the hopper on the stand to shake up or redistribute the meat within the hopper for thorough shredding.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
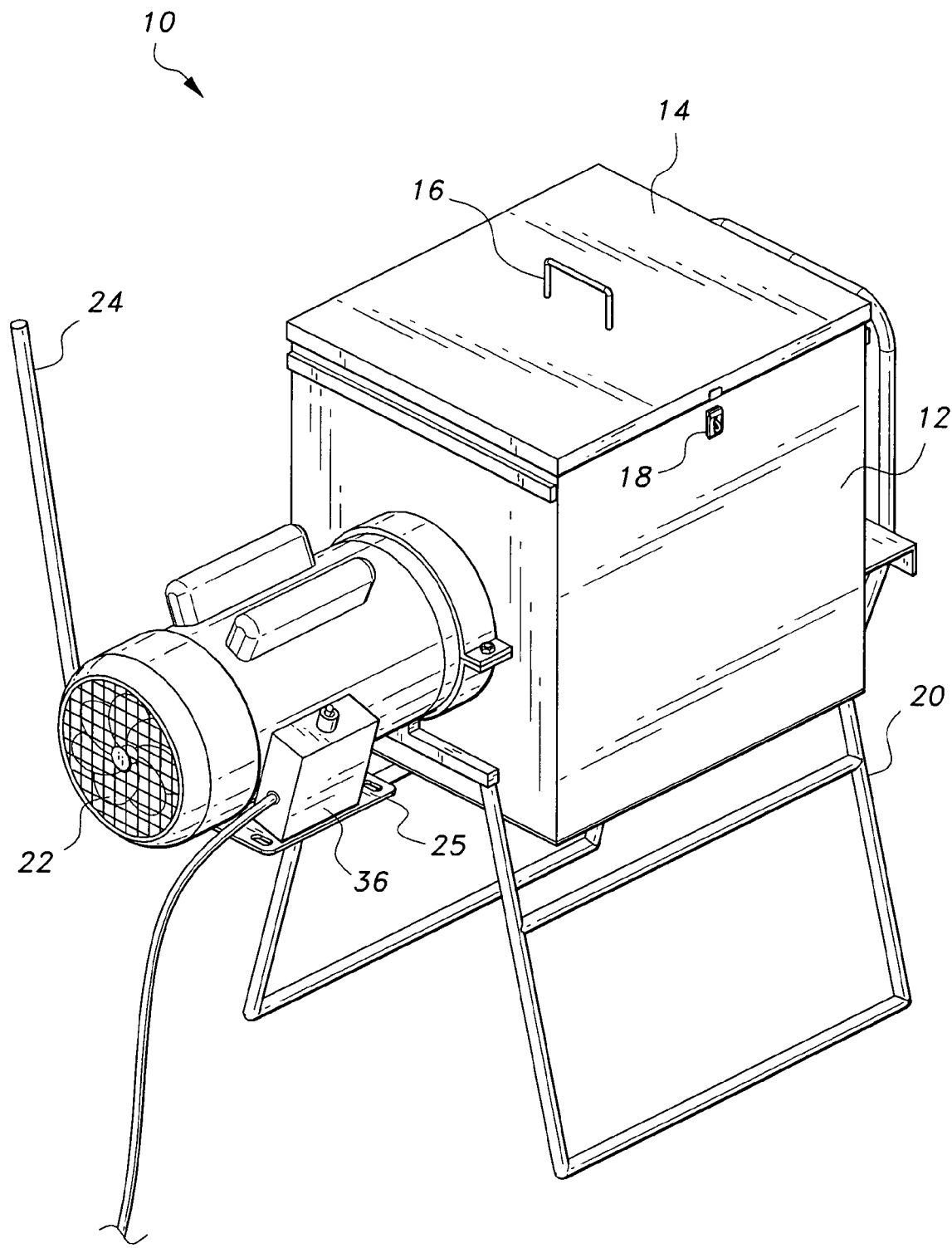
FIG. 1 is a perspective view of a meat shredder according to the present invention.
Figure 2:
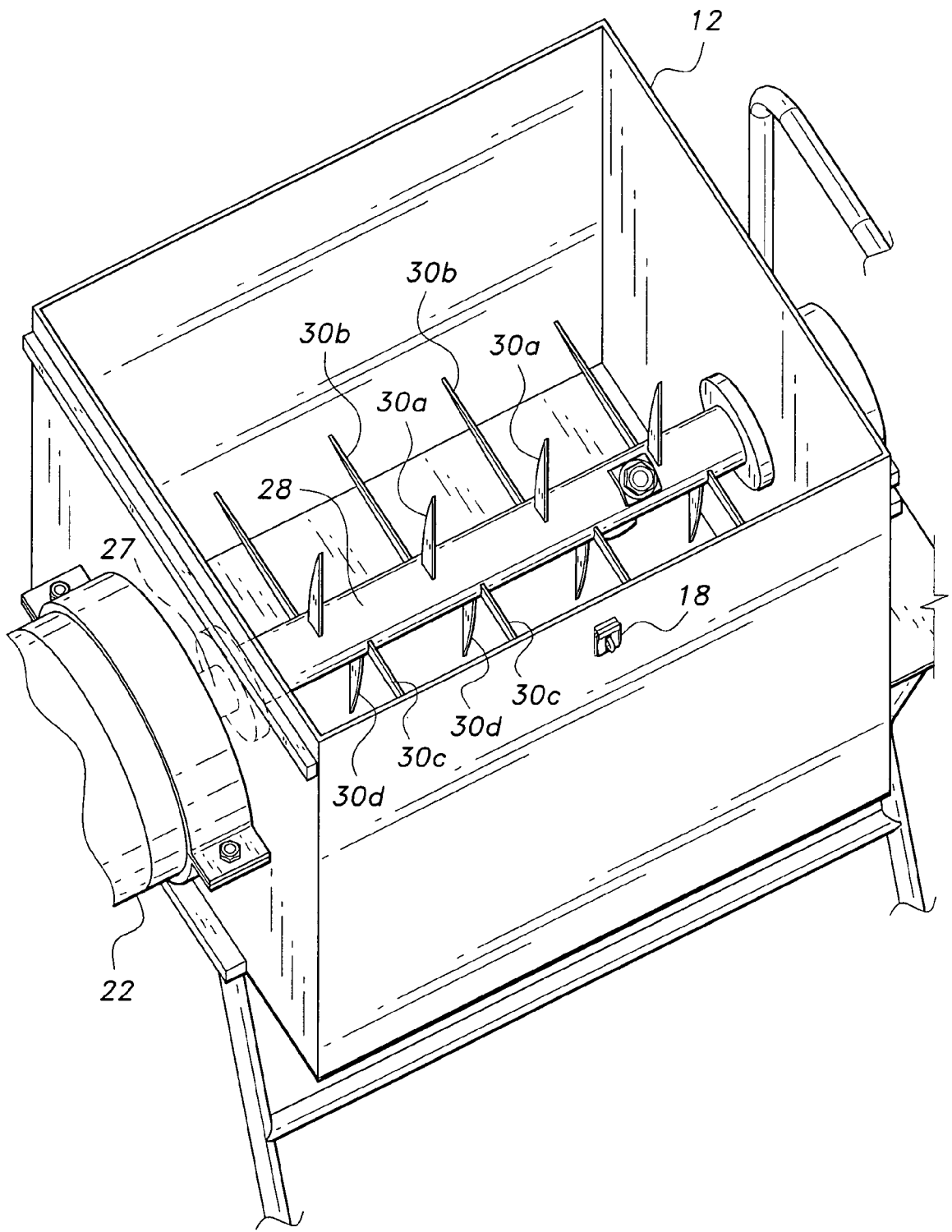
FIG. 2 is a partial perspective view of the meat shredder according to the present invention as seen from above, the cover being removed.
Figure 3:
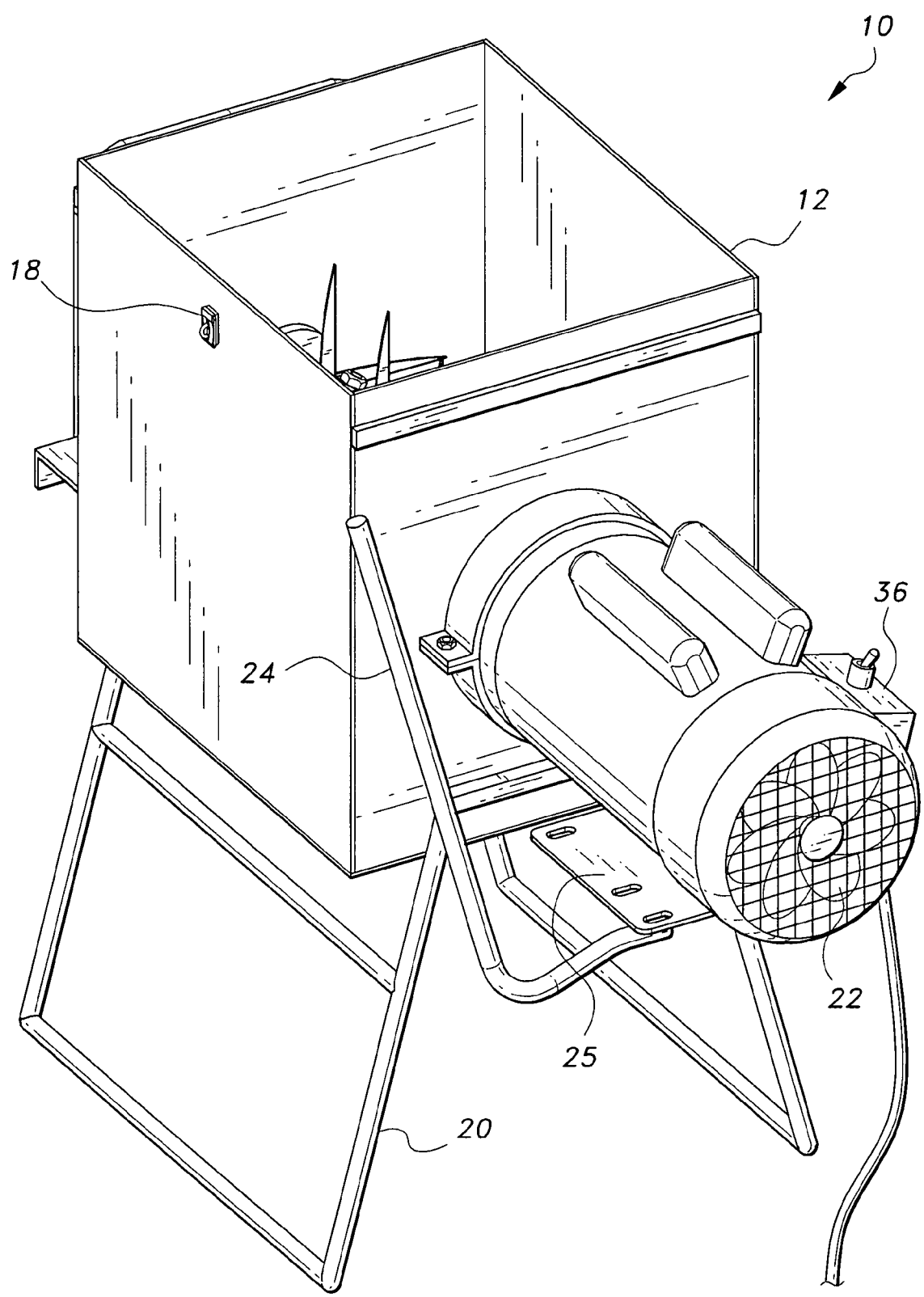
FIG. 3 is a perspective view of the meat shredder according to the present invention as seen from the motor side of the hopper, the cover being removed.

The present invention relates to a meat shredder 10. As best shown in FIGS. 1 and 2, the meat shredder 10 includes a hopper 12, which defines an open interior region adapted for receiving meat to be shredded. The hopper 12 is preferably formed from stainless steel or other suitable stainless, food-safe, non-corrosive and easily cleanable materials. The hopper is preferably box-shaped, as shown in the drawings, although the hopper may have any other suitable shape.

A spindle 28 (best shown in FIG. 2) is preferably rotatably mounted within the open interior region of hopper 12, and has a plurality of triangular-shaped blades 30a, 30b, 30c, 30d (the reference number 30 refers to a blade generally, the letter suffixes "a", "b", etc. designating different rows extending axially along the spindle 28) extending radially therefrom for shredding the meat. The blades in adjacent rows are canted in opposite directions, i.e., the blades 30a are angled slightly in the direction away from motor 22. The spindle 28 is mounted on the shaft 27 of the motor 22, which causes rotation of the spindle 28 when the motor 22 is turned on.

Figure 4:
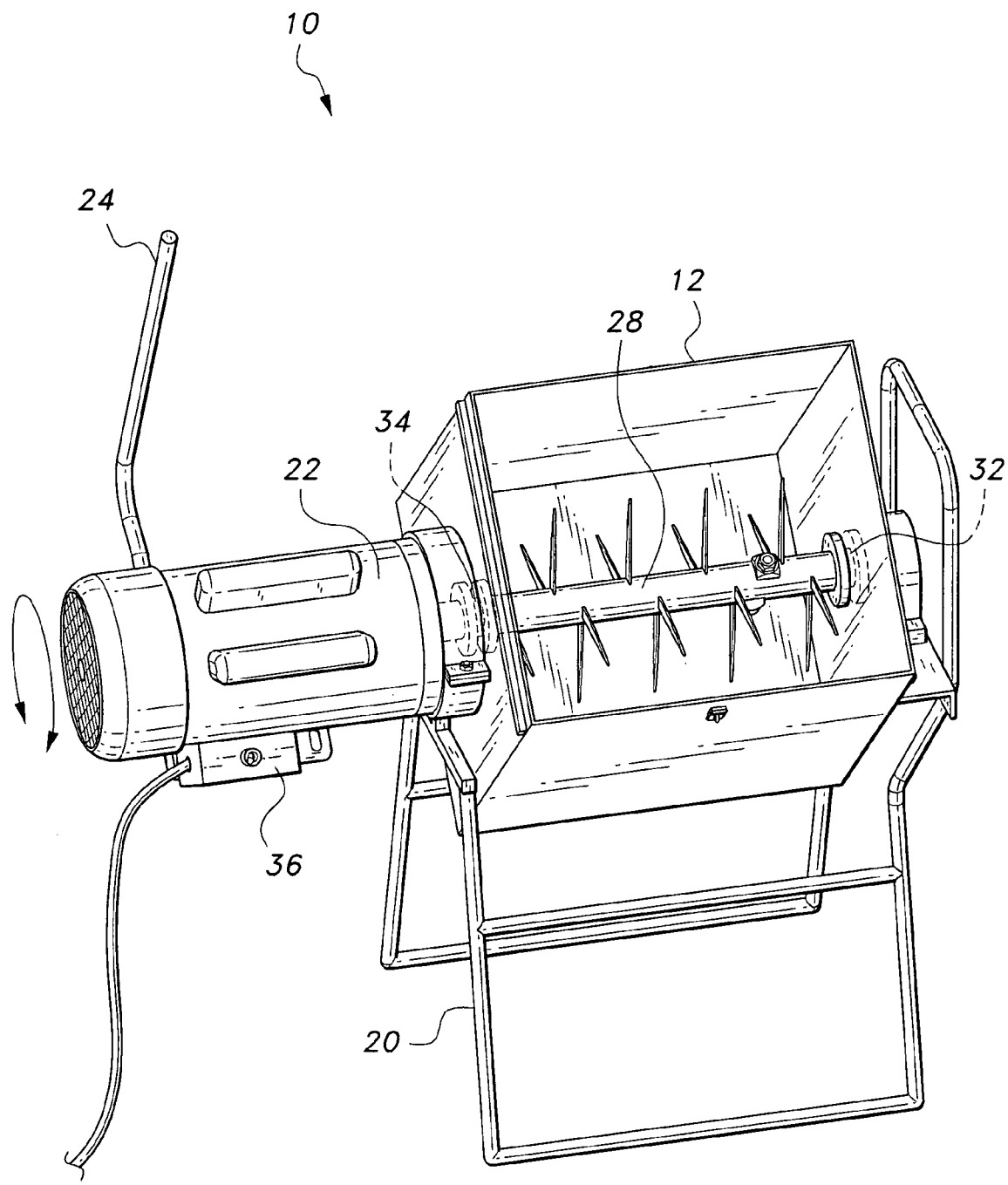
FIG. 4 is a perspective view of the meat shredder according to the present invention, showing the hopper tilted on the stand, the cover being removed.

The hopper 12 is pivotally mounted to a stand or base 20 by suitable bearings. The motor 22 is fixedly attached to the hopper 12 for rotation therewith, as shown by the directional arrow in FIG. 4, allowing the user to selectively rotate the hopper 12 with respect to the stand 20 in order to agitate and evenly distribute the meat within the hopper 12 to assure even and thorough shredding thereof. It should be understood that stand 20 is shown for exemplary purposes only, and that any suitable type of stand may be used to pivotally support the hopper 12. In FIG. 4, the hopper 12 is shown being pivotally joined to stand 20 by bearing assemblies at 32, 34.

The motor 22 has a bracket 25 attached thereto. The motor preferably is an electric motor, and may be reversible. A control box 36 is mounted on the bracket 25 and may include one or more switches for controlling the motor 22. A hand crank or handle 24 is releasably attached to the bracket 25, as shown in FIGS. 1, 2 and 4. The handle 24 may be an elongated, angled rod that can be used as a crank to manually rotate the hopper 12 and motor 22 affixed thereto as a unit, or to alternately rock the motor 22 and hopper 12 assembly clockwise and counterclockwise on the stand 20 to agitate or redistribute meat in the hopper 12.

Meat is inserted into the hopper 12 through the open, upper end. A cover 14 (shown in FIG. 1) is selectively and removably covers and closes the open, upper end of the hopper 12. Latches 18 releasably secure the cover 14 to the hopper 12. The cover 14 may have a gripping handle 16 to allow the user to easily remove the cover 14 from the hopper 12. A pair of latches 18 are shown in the drawings, although it should be understood that any suitable number of latches may be provided.

In use, the user places meat within hopper 12 through the open, upper end. The user may selectively and adjustably actuate motor 22 to drive spindle 28. The rows of blades 30a-30d shred the meat contained within hopper 12. Cover 14 may be used to close the hopper 12, thus preventing accidental injury while the spindle 28 is rotating. In order to evenly distribute the meat within hopper 12 for even shredding thereof, the user may rotate the hopper 12 with respect to stand 20 by gripping and rotating the handle 24.

It is to be understood that the present invention is not limited to the embodiments described above, but encompasses any and all embodiments within the scope of the following claims.

We claim:

1. A meat shredder, comprising:
    a hopper defining an open interior region adapted for receiving meat to be shredded, the hopper having an open top;
    a stand, the hopper being horizontally disposed on and pivotally mounted to the stand;
    a motor fixedly attached to the hopper, the motor having a selectively rotatable shaft extending into the interior region of the hopper for 360° rotation therewith;
    a spindle coupled to the shaft for rotation therewith, the spindle being disposed within the hopper;

a plurality of blades extending radially from the spindle, the blades being disposed in a plurality of rows extending axially along the spindle, wherein the blades in alternate rows of said plurality of rows are canted in opposite directions; and a hand crank removably attachable to the motor, the hand crank manually rotating the motor and the hopper together as a unit for 360° on the stand for agitating and redistributing meat in the hopper.

2. The meat shredder as recited in claim 1, wherein said blades are triangular in shape.

3. The meat shredder as recited in claim 1, further comprising a bracket attached to said motor, said hand crank being removably attachable to the bracket.

4. The meat shredder as recited in claim 3, further comprising a motor control unit attached to said bracket and electrically connected to said motor for selectively controlling rotation of the shaft and the spindle attached to the shaft.

5. The meat shredder as recited in claim 4, further comprising a cover releasably disposed over and selectively covering the open top of said hopper.

6. The meat shredder as recited in claim 5, further comprising at least one latch releasably securing the cover over the open top of said hopper.

7. The meat shredder as recited in claim 5, further comprising a gripping handle mounted to an upper surface of the cover.

* * * * *